United States Patent
Püttmann

(10) Patent No.: US 6,340,270 B2
(45) Date of Patent: Jan. 22, 2002

(54) APPARATUS AND METHOD FOR THE LONGITUDINAL SPLITTING OF PIPES LAID UNDERGROUND

(75) Inventor: Franz-Josef Püttmann, Lennestadt (DE)

(73) Assignee: Tracto-Technik Paul Schmidt Spezialmaschinen, Lennestadt (DE)

( * ) Notice: Subject to any disclaimer, the term of this patent is extended or adjusted under 35 U.S.C. 154(b) by 0 days.

(21) Appl. No.: 09/824,413

(22) Filed: Apr. 2, 2001

Related U.S. Application Data

(63) Continuation of application No. 09/349,649, filed on Jul. 8, 1999, now abandoned.

(30) Foreign Application Priority Data

Jul. 11, 1998 (DE) .......................................... 198 31 190

(51) Int. Cl.⁷ .......................... F16L 55/18; B23K 37/02
(52) U.S. Cl. .................... 405/184.3; 405/184; 405/156; 166/55.2; 138/97; 30/92.5
(58) Field of Search .............................. 405/184, 184.1, 405/184.2, 184.3; 30/92.5; 138/97; 166/55.2

(56) References Cited

U.S. PATENT DOCUMENTS 2,983,042 A * 5/1961 Frantz et al. ................ 30/92.5
3,181,302 A   5/1965 Lindsay
4,455,107 A   6/1984 Schosek
4,903,406 A   2/1990 Schosek et al.
5,078,546 A * 1/1992 Fisk et al. ................ 405/184.3
5,098,225 A   3/1992 Rockower et al.
5,171,106 A  12/1992 Rockower et al.
5,306,101 A   4/1994 Rockower et al.
5,439,320 A   8/1995 Abrams
5,980,157 A * 11/1999 Puttmann ..................... 405/184

FOREIGN PATENT DOCUMENTS

DE    196 08 980 C2    5/1998
DE    198 17 873 A1   10/1999

* cited by examiner

Primary Examiner—David Bagnell
Assistant Examiner—Frederick L. Lagman
(74) Attorney, Agent, or Firm—Cook, Alex, McFarron, Manzo, Cummings & Mehler, Ltd.

(57) ABSTRACT

An apparatus for longitudinal splitting, in particular longitudinal slitting, of pipes laid underground and for the simultaneous trenchless pulling-in of a new pipeline comprises a carriage in the form of a frame, in which a cutting wheel for cutting open the pipe wall and a support roller, which serves as an abutment and is supported on the pipe wall, are arranged above one another. The carriage or frame has a base which engages in a form-fitting manner in a frame-like window of a pull and/or push linkage.

24 Claims, 6 Drawing Sheets

APPARATUS AND METHOD FOR THE LONGITUDINAL SPLITTING OF PIPES LAID UNDERGROUND

Figure 1:
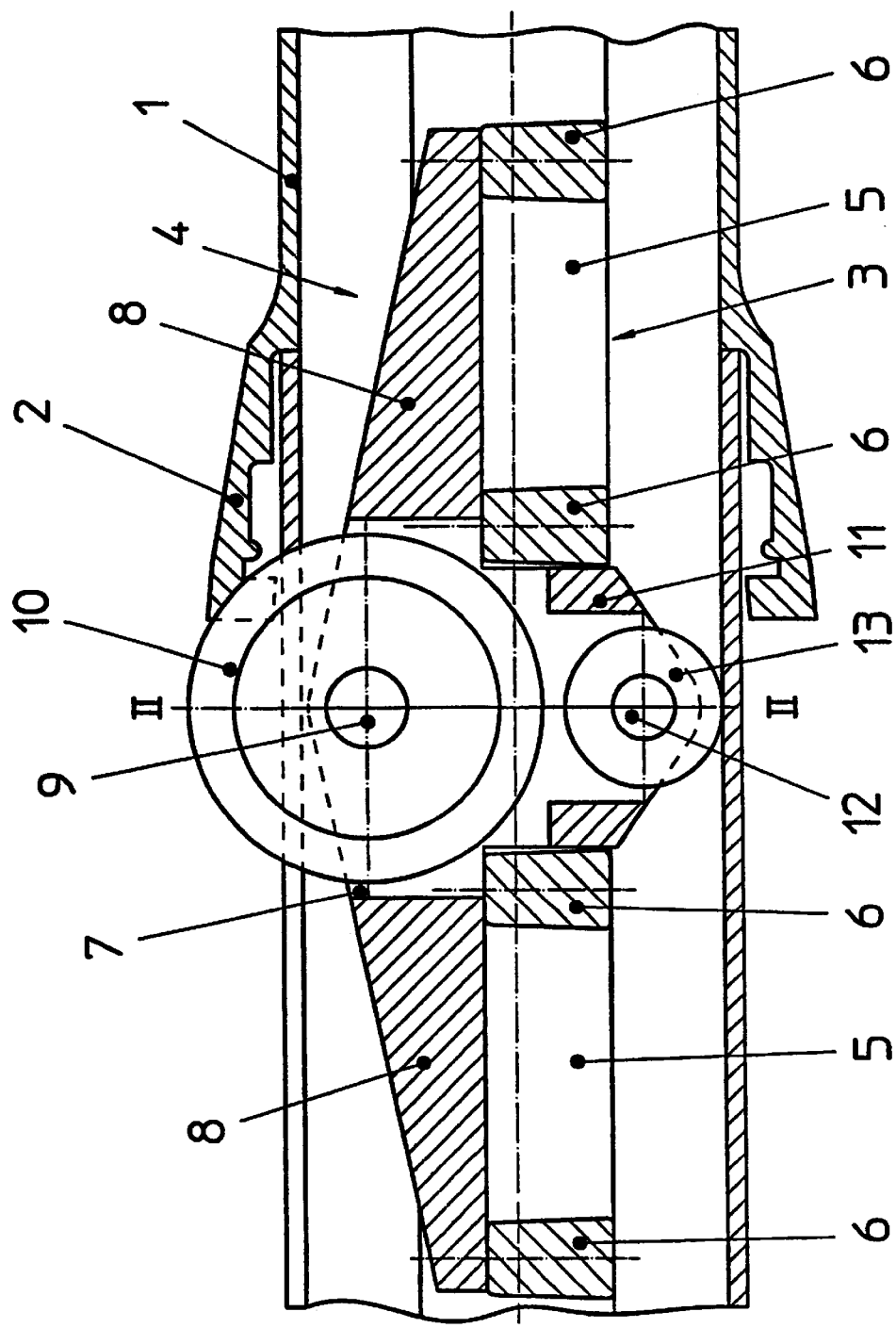

This application is a continuation of application Ser. No. 09/349,649 filed Jul. 8, 1999, now abandoned.

The invention relates to an apparatus for the longitudinal splitting of pipes which are laid underground and are made in particular from ductile materials, such as steel pipes, centrifugally cast pipes made from cast iron containing spheroidal graphite, and plastic pipes.

The trenchless initial laying of pipelines underground and the destructive replacement of underground pipelines have become increasingly popular in practice in recent decades. This requires automatically driven and/or pulled equipment which can be equipped with tools for destroying a pipeline which is to be replaced. The destruction of brittle pipes generally does not present any particular problems, since such pipes break up and the fragments can be displaced laterally into the earth or can be conveyed away.

By contrast, the destructive replacement of pipes made from tough materials, such as steel pipes, cast steel pipes and plastic pipes, which owing to their toughness cannot be broken into fragments, presents greater difficulty. In these cases, destruction by cutting is recommended, but even this method presents problems in the case of socket pipes or pipes which have been provided with repair fittings, owing to the high friction forces and the high cutting forces which are required in order for these pipes to be cut open.

U.S. Pat. No. 5,439,320 has already disclosed a static method in which a pipe cutter, in the form of a frame equipped with two cutting wheels, is pulled through the pipe which is to be destroyed with the aid of a pipe linkage. A double cone, the maximum diameter of which may be larger than the internal diameter of the pipe, is arranged in the frame, between the two cutting wheels. This double cone is used to guide the implement inside the old pipe and, at the same time, to bend open the pipe which has been slit by the cutting wheel which is situated in front of it in the direction of movement, while the cutting wheel which is situated behind the double cone is arranged in the frame in such a way that it projects radially beyond the other cutting wheel and is therefore able to cut open a socket joint by dint of its external diameter being larger than the pipe; in doing so, it follows a groove which has already been created in the area of the socket joint by the first cutting wheel. In addition, a conical expander head is screwed to the rear end of the frame, which expander head expands the longitudinally slit pipe further and, at the same time, pulls in a new pipe.

A drawback of this appliance is the considerable wall friction between the guide cone and the pipe wall, which not only requires high pulling forces but also, in the case of very dirty or partly blocked pipes, may lead to the appliance becoming jammed. An appliance which is known from U.S. Pat. No. 4,903,406, in which a cutting wheel is arranged in a frame between two rotatably mounted support wheels, avoids such skin friction. The frame is screwed, on the one hand, to a pull linkage and, on the other hand, to an expander cone, which is followed by a follower pipe. This screw connection is time-consuming and may be difficult if the screw threads are dirty or damaged.

Since the support wheels are arranged at a relatively great distance from one another, the frame is comparatively long and, in view of the comparatively great distance between the cutting-wheel axle and the support-wheel axles, is subject to considerable flexural forces.

The invention is based on the object of providing a pipe cutter or pipe breaker which is of simple design, is able to withstand high loads and can be connected to a linkage in a simple manner.

The solution to this problem is an apparatus having a carriage, in which in each case at least one rotatable cutting wheel for the longitudinal splitting, in particular longitudinal slitting, of a pipe and at least one support roller are arranged above one another, and which is connected in a form-fitting manner to a pull and/or push linkage. The term cutting wheels also encompasses wheels which break open the pipe wall.

The form-fitting connection can be achieved with the aid of a plug-together connection in which, for example, a base of the carriage engages behind a shoulder on the linkage or in a complementary opening, preferably a rectangular window, in the linkage. In the base, the support roller may preferably be mounted vertically beneath the cutting roller, resulting in an extremely compact and stable connection between the carriage and the window, which is, for example, frame-like, with the cutting wheel arranged above it.

The stability of the carriage/linkage system is increased still further if extension arms are arranged on both sides of the cutting wheel or of a plurality of cutting wheels and bear against the linkage. This results in a high anti-tipping security even when the carriage with the cutting wheel is supported on only a single roller.

A frame-like window and a correspondingly contoured base also prevent the cutting wheel from rotating about an axis which is perpendicular to the linkage and therefore also prevent the cutting wheel from becoming trapped in the slit which it has created. The cutting wheel therefore moves in a straight line and with correspondingly little friction from the pipe wall or the slit which the cutting wheel has created.

The carriage may also be provided with a plurality of cutting wheels which are arranged one behind the other and at staggered heights, each of which cutting wheels performs a particular function. For example, the front wheel, as seen in the direction of movement, can be used to cut open the pipe wall, while the following cutting wheel is arranged in such a way that it projects radially beyond the front cutting wheel and is therefore able to cut open a pipe socket joint. A third cutting wheel which projects radially beyond both the cutting wheels arranged in front of it is then responsible for cutting open or fully cutting open heavy repair fittings or sleeves which surround the pipe.

If a plurality of cutting wheels are used, it is not necessary for each cutting wheel to be assigned a support roller, although this is advantageous for static reasons.

The cutting carriage may be connected to a following expander member, with the aid of which the longitudinally split pipe is spread or bent open. The expander member and/or the cutting carriage may also be provided with blade cutters. In this way, it is possible for even relatively old pipelines, which often contain sections made from different materials, to be split in the longitudinal direction.

Furthermore, it is also possible to arrange a plurality of cutting carriages one behind the another and to connect them to one another or in each case to the linkage.

The cutting wheels and/or support rollers are made easy to install and remove if they are arranged on separate T-shaped plug-in pins which are held in situ by the frame of the window in the linkage in which the base having the plug-in pins is arranged.

In order to keep the pulling force which is required for longitudinal splitting at a low level, the cutting wheel may be contoured in the form of a circular saw blade, i.e. may have teeth whose backs are designed as cutters and cut through the pipe wall by levering it up from the inside. The eccentric action of the teeth means that the forces which act on the pipe wall are very high, so that the available pulling force is optimally exploited or can be lower than if a circular blade is used. This is of enormous importance particularly where there are strong repair sleeves. If the cutting carriage is equipped with a toothed wheel, a tooth comes to bear against the end side of the pipeline. If this cutting carriage is then pulled or pushed through the pipeline, the cutting roller must inevitably rotate. As a result of this forced rotation of the cutting roller, the following cutting tooth then rotates so as to cut or break into the pipe wall, thus creating the start of a slit.

The linkage which accommodates the cutting carriage is advantageously connected to an expander member which may be arranged on a pulling head. This pulling head may furthermore bear a support sleeve and may be connected to a follower pipe.

The linkage advantageously comprises ladder sections in which the side members and the rungs form windows into which a correspondingly dimensioned base of the cutting-wheel carriage can be fitted without difficulties. In this case, a special securing means for the plug connection is not absolutely necessary, since the wall of the pipeline which has been laid underground holds the linkage and the cutting-wheel carriage together.

Such a linkage with a push-pull drive for its stepwise movement through an underground pipe is described in German Patent 196 08 980, the content of which is to be regarded as part of this description.

A method in which, starting from a start shaft, a linkage is pushed through the pipeline until it reaches a target shaft, where the linkage is provided with a cutting appliance, for example a cutting appliance with a cutter which is directed downward, and, together with a following expander member and a follower pipe, is moved back to the target shaft, is preferably suitable for the longitudinal splitting of a pipeline which is laid underground and for pulling in a new pipe.

Figure 2:
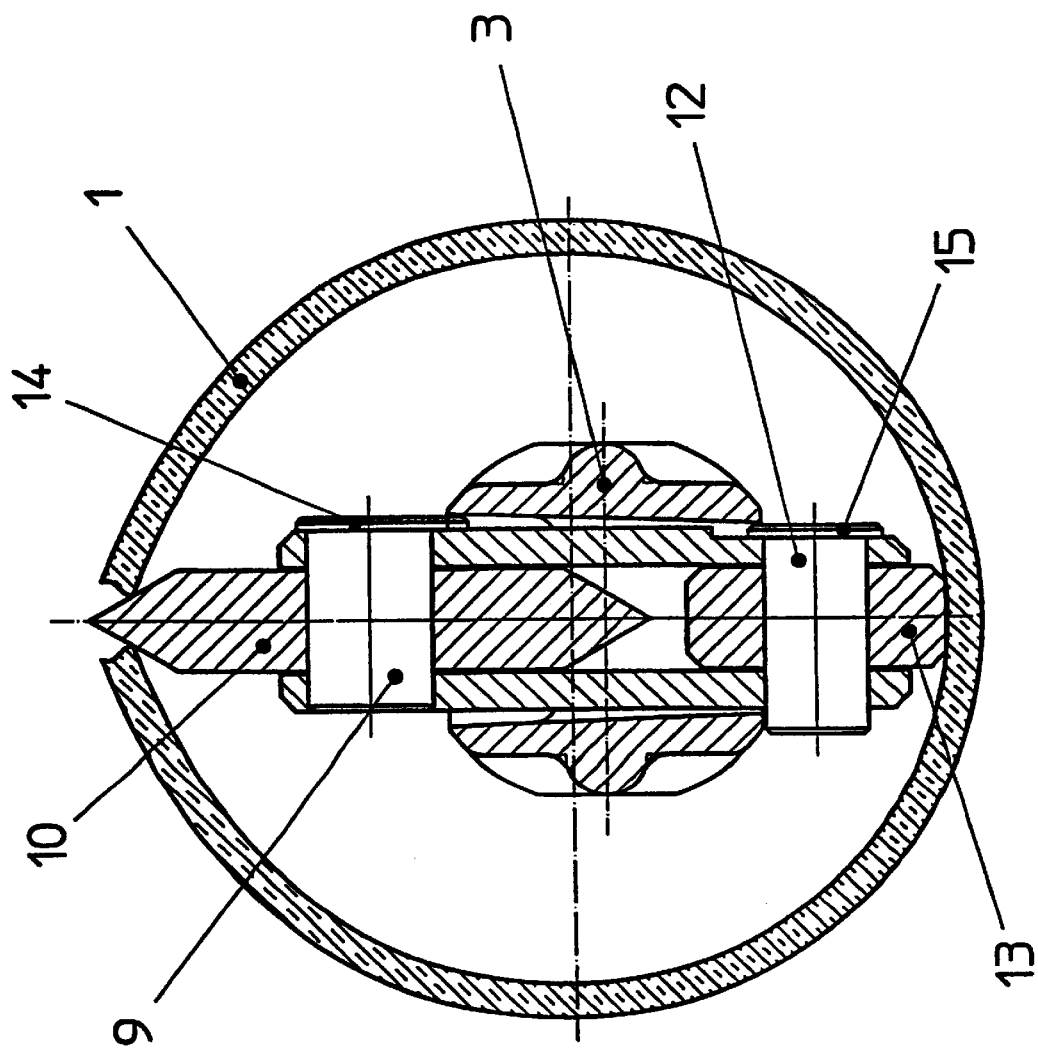
Figure 3:
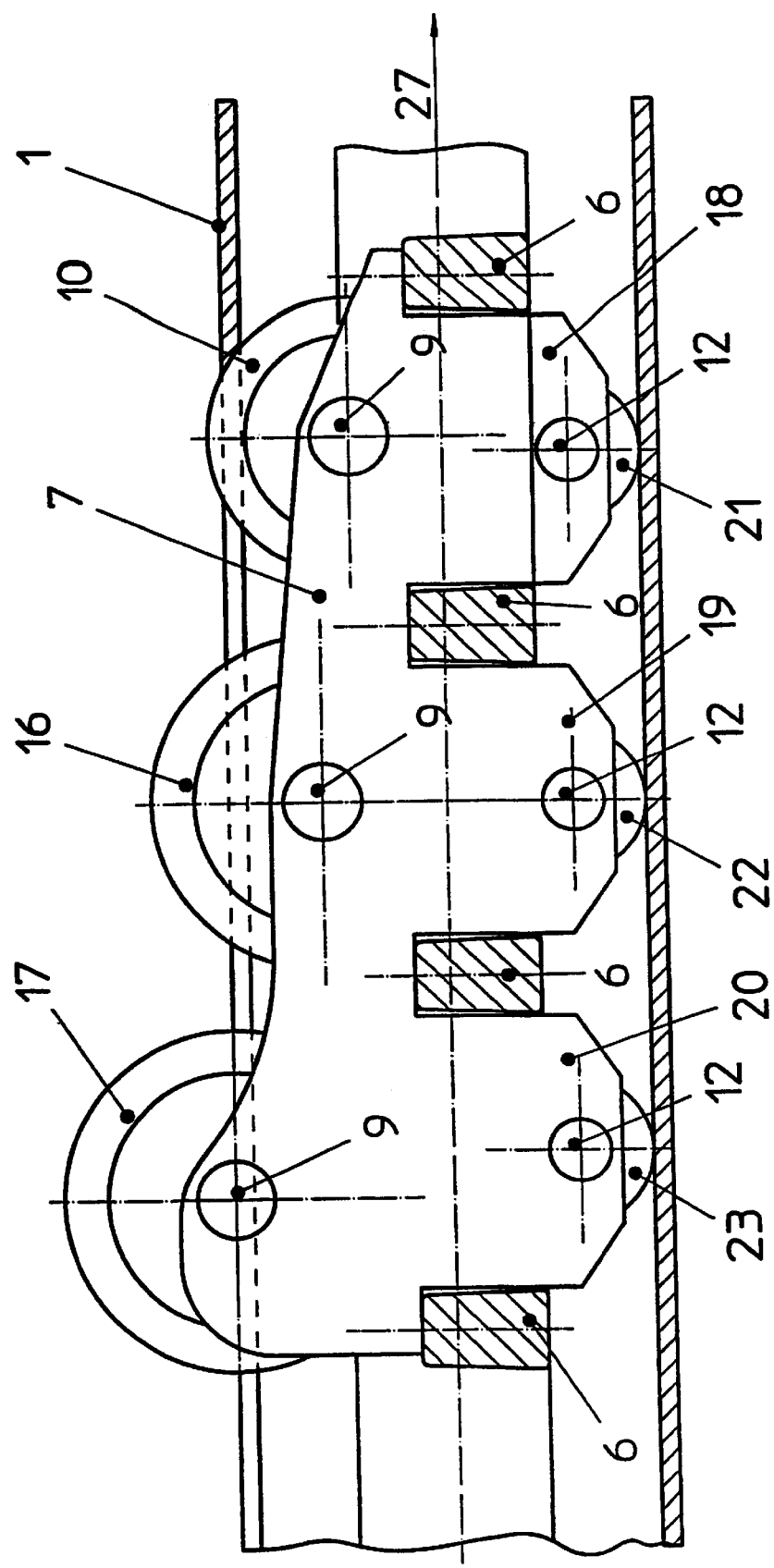
Figure 4:
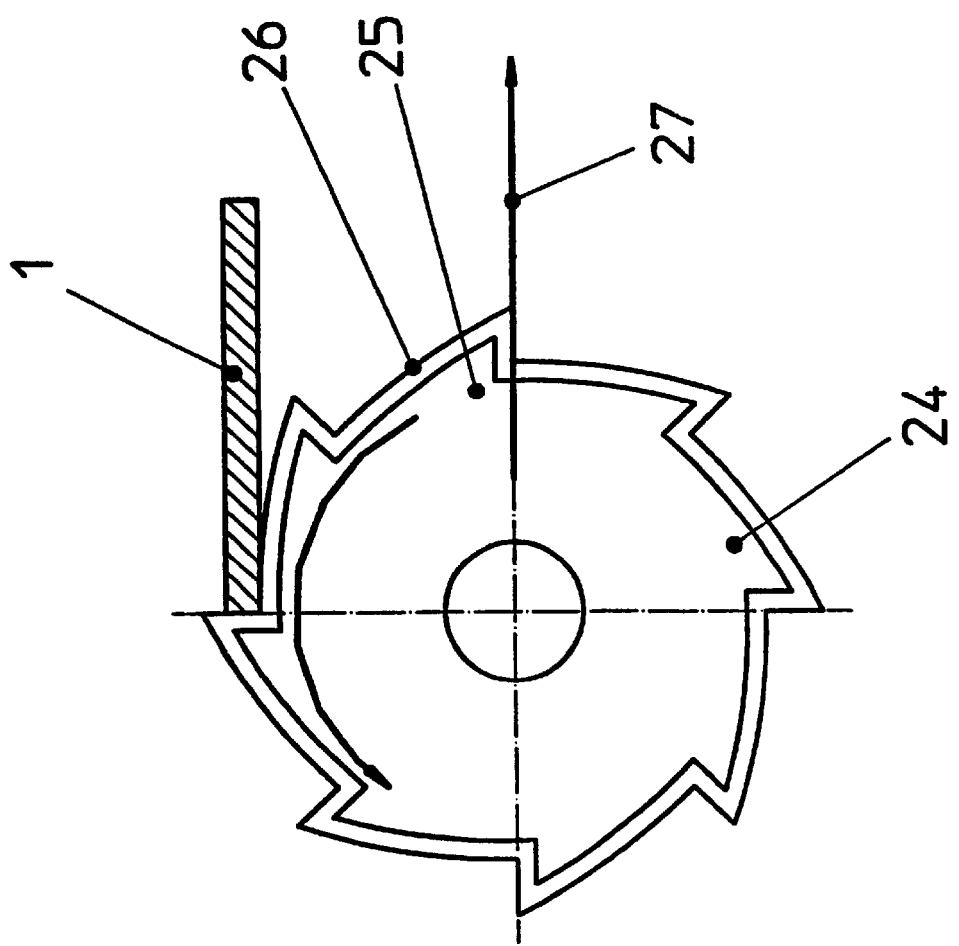
Figure 5:
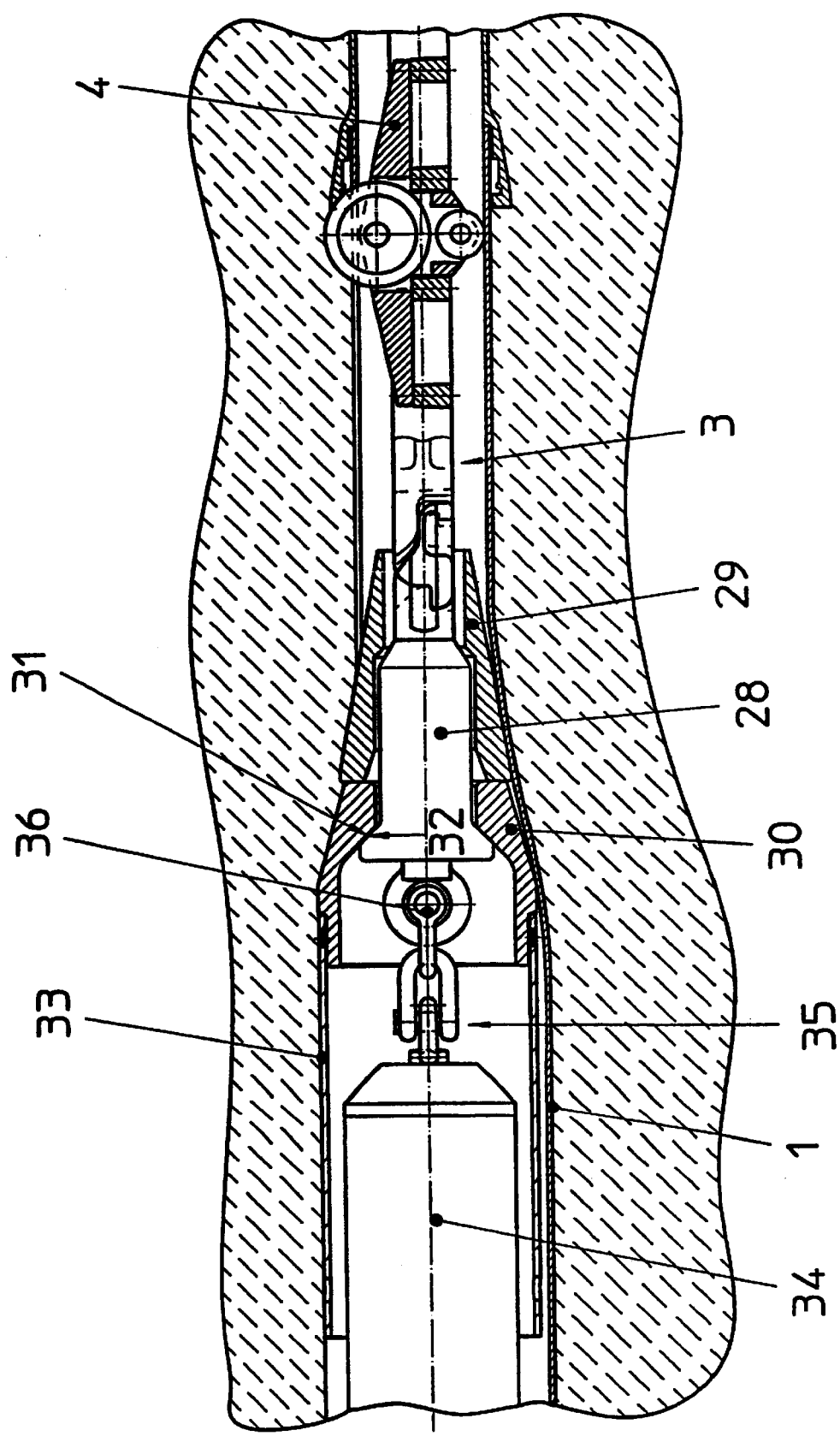
Figure 6:
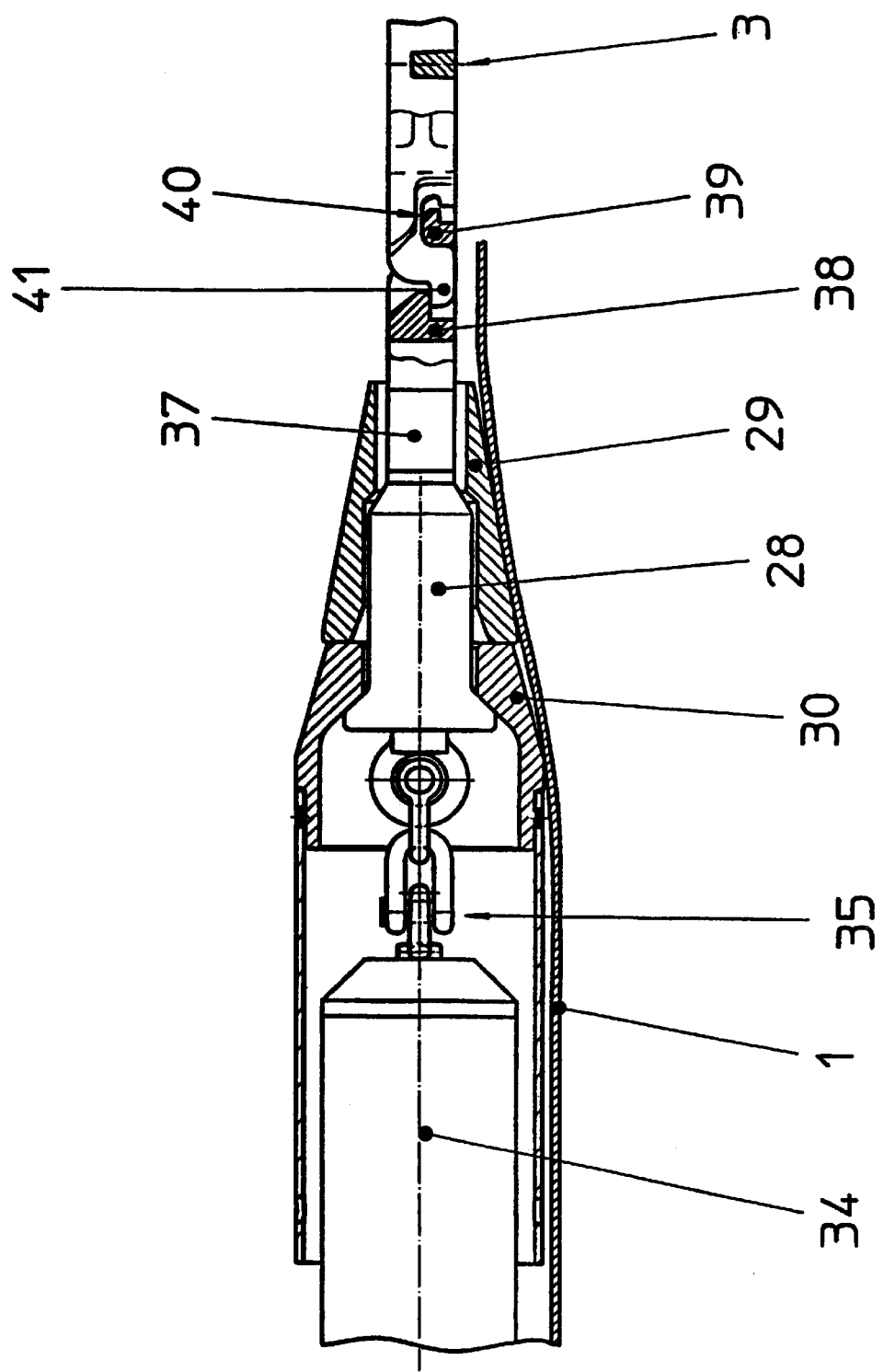

The invention is explained in more detail below with reference to exemplary embodiments illustrated in the drawing, in which:

FIG. 1 shows a cutting-wheel carriage with linkage in the area of a socket joint, FIG. 2 shows a cross section through the pipe which is to be cut open, on line II—II in FIG. 1, FIG. 3 shows a cutting-wheel carriage with a plurality of cutting wheels, FIG. 4 shows a cutting wheel which resembles a circular saw blade with a plurality of cutters, FIG. 5 shows a linkage with cutting-wheel carriage, expander member and follower pipe, and FIG. 6 shows an enlarged longitudinal section, corresponding to the illustration in FIG. 5, through the linkage which is connected to a pulling head.

A carriage 4, which is connected to a pull and/or push linkage 3, is located in a pipeline 1 with a socket 2. The linkage 3 comprises ladder-like sections with side members 5 and rungs or transverse struts 6, which are connected to one another in a form-fitting manner by means of a plug connection. The carriage 4 comprises side cheeks 7 and extension arms 8 which connect the latter and between which a cutting wheel 10 is rotatably mounted on a plug-in axle 9. Beneath the cutting wheel 10, the side cheeks 7 form a base 11 in which a support roller 13 is mounted on a plug-in pin 12. The plug-in pins 9, 12 lie vertically above one another and each have a flange 14, 15 which in situ bears against one of the side members 5 of the linkage 3 and is secured in this way.

As can be seen from the illustration in FIG. 3, it is also possible for a plurality of cutting wheels 10, 16, 17 to be arranged one behind the other, at staggered heights, between the cheeks 7, so that the middle cutting wheel 16 projects beyond the front cutting wheel 10, and the rear cutting wheel 17 projects beyond the two cutting wheels 16, 10 situated in front of it. The front cutting wheel 10 is used to divide the standard pipe wall, while the two cutting wheels 16, 17 situated behind it in accordance with the illustration in FIG. 3 do not operate until the middle cutting wheel 16 comes into contact with a socket joint and cuts open the bell socket (cf. FIG. 1), which is not illustrated in FIG. 3, while the front cutting wheel 10 cuts open the pipe end which projects into the socket and the rear cutting wheel 17 remains inoperational. The latter cutting wheel only comes into action when the pipe is surrounded by a repair fitting which is then provided with a preliminary cut by the middle cutting wheel 16 and is cut through completely by the rear cutting wheel 17.

Each cutting wheel 10, 16, 17 is assigned a base 18, 19, 20, each with a support roller 21, 22, 23, each base engaging between two struts 6 of the ladder linkage 3. The side members 5 and the transverse struts 6 form a rectangular window into which the base 11 engages in a form-fitting manner, resulting overall in a connection between cutting carriage and linkage which is extremely stable but of little complexity.

A particularly high cutting force is produced if the cutting wheel is designed, in accordance with the illustration shown in FIG. 4, in the form of a circular saw blade 24 or side-milling cutter with teeth 25. In this case, the tooth back 26 is designed as the cutter 26, which acts as a lever and cuts open the pipe wall from the inside outward when the linkage, together with the carriage, moves toward the right in FIG. 4, in the direction of the arrow 27.

At its rear end, the linkage 3 is connected to a pulling head 28, onto which an expander member 29 and a support sleeve 30 are loosely fitted one behind the other. A conical inner shoulder 31 of the support sleeve 30 bears against a correspondingly conical flange 32 of the pulling head 28, and the support sleeve 30 has a tubular extension 33 into which the front end of a follower pipe 34 projects, which is articulatedly connected to a transverse pin 36 of the support member 30 via a coupling 35.

The front end of the pulling head 28 is provided with two parallel lugs 37, between which two inverted L-shaped rungs 38, 39 extend at a distance from one another (cf. FIG. 6). The complementary free end of the linkage 3 engages over the rung 39 in the manner of a claw, which free end is provided with an inverted L-shaped recess 40 and, in addition, engages beneath the rung 38 by means of a projection 41. This results in a simple plug-together coupling which is exactly the same as the plug-together couplings between the individual sections of the linkage 3. The plug-together coupling has a certain play and therefore acts as an articulated joint between the cutting-wheel carriage 4 and the pulling head 28. This or another articulated joint allows a certain upward displacement of the pulling head and of the expander member 29, 30, which has proven necessary because the earth beneath the old pipe 1 does not yield, whereas the old pipe is cut open at its top side. Depending on the distance between the carriage 4 and the pulling head, it is also possible to dispense with the articulated joint if the linkage 3 is able to bend sufficiently.

Further details of the linkage and of the linkage drive, and of the way in which the linkage operates, can be found in German Patent 196 08 980 and the prior German Patent Application 198 17 873.5.

The apparatus according to the invention is used in such a way that the linkage 3 is initially pushed into the pipeline 1 which is to be replaced from one side, for example from a standard inspection shaft, and in the target shaft is provided with the cutting carriage 4 and is coupled to the pulling head 28. Then, the linkage is moved back in a stepwise manner into the starting shaft. In the process, the cutting wheel 10 breaks open the pipeline 1 and the expander head 29 and the conical front part of the support pipe 30 bend the slit pipe approximately a quarter open, in the form of a shell, while simultaneously laterally displacing the earth, sufficiently far for the follower pipe 34 to be pulled in without difficulty. The cutting carriage 4 is preferably arranged in such a way that the cutting wheel 10 faces downward, so that the slit and bent-open pipe surrounds the new or follower pipe in the form of a shell. In this way, the bent-open old pipe protects the new pipe from damage, for example in the event of earthworks being carried out using an excavator. Moreover, an old pipe which is open at the bottom prevents earth from penetrating into its interior.

What is claimed is:

1. An apparatus for the longitudinal splitting of pipes laid underground, comprising a carriage in which at least one rotatably cutting wheel and at least one support roller are located above one another, and pull and/or push linkage which is connected in a form-fitting manner to the carriage.

2. The apparatus as claimed in claim 1, wherein the carriage engages, by means of a base, on a complementary shoulder of the linkage.

3. The apparatus as claimed in claim 2, defining a rectangular window in the linkage for receiving the base.

4. The apparatus as claimed in claim 1 wherein the carriage includes a base and the support roller is mounted in the base.

5. The apparatus as claimed in claim 1 wherein the carriage includes an extension arm on each side of the cutting wheel.

6. The apparatus as claimed in claim 5, wherein the extension arms bear against the linkage.

7. The apparatus as claimed in claim 1, which comprises a plurality of cutting wheels which are arranged one behind the other and at staggered heights.

8. The apparatus as claimed in claim 7, wherein a plurality of cutting wheels and support rollers are arranged in pairs in the carriage, with the pairs being one behind the other.

9. The apparatus as claimed in claim 8, wherein each cutting wheel has an axles and the cutting-wheel axles are arranged at different distances from the linkage.

10. The apparatus as claimed in claim 7, wherein the cutting wheels have different diameters.

11. The apparatus as claimed in claim 1, wherein at least one cutting wheel is provided with teeth.

12. The apparatus as claimed in claim 1, wherein selected of the at least one cutting wheels and the at least one support roller are arranged on separate plug-in axles.

13. The apparatus as claimed in claim 12, wherein the plug-in axles are held in situ by a ladder linkage including side members.

14. The apparatus as claimed in claim 1, wherein the linkage is connected to an expander member.

15. The apparatus as claimed in claim 1, wherein the linkage is connected to a pulling head.

16. The apparatus as claimed in claim 15, wherein an expander head is arranged on the pulling head.

17. The apparatus as claimed in claim 16, wherein the linkage or the expander head is connected to a follower pipe.

18. The apparatus as claimed in claim 17, wherein the carriage and the expander member or the pulling head are arranged at a distance from one another.

19. The apparatus as claimed in claim 15 wherein a support sleeve is arranged on the pulling head.

20. The apparatus as claimed in claim 19, wherein an expanded head is arranged on the pulling head and the carriage and/or the expander head are provided with cutter blades which are directed longitudinally.

21. The apparatus as claimed in claim 15, wherein the pulling head is connected to a follower pipe.

22. The apparatus as claimed in claim 15 wherein an articulated joint is arranged between the carriage and the expander member and/or the pulling head.

23. A method for the longitudinal splitting of a pipeline which is laid underground and for pulling in a new pipe, wherein, starting from a start shaft, pushing or pulling a linkage through the pipeline until it reaches a target shaft, providing the linkage with a cutting appliance including at least one notable cutting wheel and at least one support roller arranged above one another, and, moving the linkage and cutting appliance together with a following expander member and a follower pipe, to the target shaft.

24. The method as claimed in claim 23, wherein the cutter is directed downward in the target shaft.

* * * * *